US012573271B2

(12) United States Patent
Sethia et al.

(10) Patent No.:    US 12,573,271 B2
(45) Date of Patent:    Mar. 10, 2026

(54) AUTOMATED TELLER MACHINE (ATM) TRANSACTION RESILIENCY USING A LONG RANGE WIDE AREA NETWORK

(71) Applicant: Bank of America Corporation, Charlotte, NC (US)

(72) Inventors: Maneesh Kumar Sethia, Hyderabad (IN); Sandeep Kumar Chauhan, Hyderabad (IN); Saurabh Arora, Gurugram (IN); Shyam K Dhanraj, Chennai (IN)

(73) Assignee: Bank of America Corporation, Charlotte, NC (US)

( * ) Notice: Subject to any disclaimer, the term of this patent is extended or adjusted under 35 U.S.C. 154(b) by 90 days.

(21) Appl. No.: 18/113,189

(22) Filed: Feb. 23, 2023

(65) Prior Publication Data

US 2024/0290182 A1    Aug. 29, 2024

(51) Int. Cl.
*G07F 19/00*    (2006.01)
*G06Q 20/18*    (2012.01)
(52) U.S. Cl.
CPC ........... *G07F 19/209* (2013.01); *G06Q 20/18* (2013.01)
(58) Field of Classification Search
CPC ....... G07F 19/209; G07F 19/20; G07F 19/211
See application file for complete search history.

(56) References Cited

U.S. PATENT DOCUMENTS

| | | | | |
|---|---|---|---|---|
| 3,916,124 A | * | 10/1975 | Joel, Jr. ................... | H04Q 3/545 379/274 |
| 5,434,853 A | * | 7/1995 | Hemmady ............ | H04W 36/18 370/335 |
| 5,715,250 A | * | 2/1998 | Watanabe .......... | H04Q 11/0478 370/401 |

(Continued)

FOREIGN PATENT DOCUMENTS

| | | | | |
|---|---|---|---|---|
| CA | 2478548 C | * | 3/2014 | ........... G06Q 20/042 |
| WO | WO-2022005424 A2 | * | 1/2022 | ........... G07F 19/209 |

OTHER PUBLICATIONS

"5G and LoRaWAN—Connecting the Next Billion IoT Devices", Nov. 29, 2021. Available at: https://www.telecoms.com/5g-6g/5g-and-lorawan-connecting-the-next-billion-iot-devices (Year: 2021).*

*Primary Examiner* — Gregory Harper
(74) *Attorney, Agent, or Firm* — Weiss & Arons LLP

(57)    ABSTRACT

An ATM includes a long range WAN module that provides the ATM with a low power WAN (LPWAN) capability for increased resiliency. The ATM and bank application servers generally communicate over an ATM communications network to allow customers to perform banking transactions. When this connection is not functioning, the ATM may continue to be used to perform banking transactions, without interruption, by communicating over a LoRaWAN network with another nearby LPWAN-enabled ATM that is in communication with the bank application servers. The LoRaWAN network may also be used to automatically obtain software to fix an error at the ATM when the software (Continued)

is obtainable via a nearby LPWAN-enabled ATM. The LoRaWAN module may be further used to record a state of operations at the ATM and to use the record to resume the transaction where the transaction was interrupted while in progress due to an ATM outage.

3 Claims, 10 Drawing Sheets

(56) References Cited

U.S. PATENT DOCUMENTS

| | | | | |
|---|---|---|---|---|
| 6,122,674 | A * | 9/2000 | Olnowich | G06F 12/0817 |
| | | | | 711/E12.027 |
| 6,339,587 | B1 * | 1/2002 | Mishra | H04Q 3/665 |
| | | | | 370/254 |
| 6,400,687 | B1 * | 6/2002 | Davison | H04Q 11/0478 |
| | | | | 370/395.2 |
| 6,424,629 | B1 * | 7/2002 | Rubino | H04L 9/40 |
| | | | | 370/395.6 |
| 6,970,846 | B1 * | 11/2005 | Drummond | G06F 3/023 |
| | | | | 235/419 |
| 7,418,427 | B1 * | 8/2008 | Drummond | G06Q 20/105 |
| | | | | 705/41 |
| 7,959,071 | B1 * | 6/2011 | Crews | G06Q 40/02 |
| | | | | 235/382 |
| 8,121,914 | B1 * | 2/2012 | Drummond | H04L 63/12 |
| | | | | 705/35 |
| 8,342,396 | B2 * | 1/2013 | Couper | G07F 19/206 |
| | | | | 235/379 |
| 8,593,971 | B1 * | 11/2013 | Bryant | H04L 43/10 |
| | | | | 370/252 |
| 8,689,039 | B1 * | 4/2014 | Munson | G07F 19/211 |
| | | | | 714/4.12 |
| 8,870,064 | B2 * | 10/2014 | Liddell | G06Q 10/06 |
| | | | | 235/379 |
| 9,949,232 | B1 * | 4/2018 | Isola | H04W 12/64 |
| 10,825,307 | B1 * | 11/2020 | Bhuvad | G06Q 10/02 |
| 10,885,507 | B1 * | 1/2021 | Phillips | G06Q 20/4016 |
| 11,954,985 | B1 * | 4/2024 | Huang | G07F 19/20 |
| 12,260,382 | B2 * | 3/2025 | de Villiers | G07F 19/211 |
| 2002/0118416 | A1 * | 8/2002 | Stilling | H04J 14/0241 |
| | | | | 385/24 |
| 2002/0133536 | A1 * | 9/2002 | Ramachandran | G07F 19/20 |
| | | | | 709/201 |
| 2002/0138446 | A1 * | 9/2002 | Antonin | G06Q 20/3674 |
| | | | | 705/67 |
| 2003/0126084 | A1 * | 7/2003 | Drummond | H04L 67/12 |
| | | | | 707/E17.107 |
| 2003/0217005 | A1 * | 11/2003 | Drummond | G06Q 20/10 |
| | | | | 707/E17.107 |
| 2005/0038747 | A1 * | 2/2005 | Drummond | H04L 67/02 |
| | | | | 705/43 |
| 2011/0191243 | A1 * | 8/2011 | Allen | G06Q 20/1085 |
| | | | | 705/43 |
| 2013/0250755 | A1 * | 9/2013 | Clark | H04L 45/22 |
| | | | | 370/228 |
| 2015/0046322 | A1 * | 2/2015 | McCracken | G07F 19/211 |
| | | | | 705/41 |
| 2015/0046325 | A1 * | 2/2015 | McCracken | G06F 9/452 |
| | | | | 705/43 |
| 2015/0186852 | A1 * | 7/2015 | Fuentes | G06Q 20/40 |
| | | | | 705/43 |
| 2016/0092863 | A1 * | 3/2016 | Chintakayala | G07F 19/20 |
| | | | | 705/39 |
| 2016/0098904 | A1 * | 4/2016 | Choudhury | G07F 19/203 |
| | | | | 705/43 |
| 2019/0037524 | A1 * | 1/2019 | Isola | H04M 1/72457 |
| 2019/0347631 | A1 * | 11/2019 | Mossoba | G06Q 20/382 |
| 2020/0143346 | A1 * | 5/2020 | Mossoba | G07F 7/125 |
| 2020/0311708 | A1 * | 10/2020 | Bermudez | G06Q 20/4016 |
| 2020/0364989 | A1 * | 11/2020 | Benkreira | G07F 19/206 |
| 2020/0402338 | A1 * | 12/2020 | Dolan | G07C 9/00912 |
| 2021/0165790 | A1 * | 6/2021 | Chitty | G06F 16/2465 |
| 2021/0327223 | A1 * | 10/2021 | Kumar | G07F 19/211 |
| 2022/0004465 | A1 * | 1/2022 | Huntley | G06F 11/0751 |
| 2022/0007253 | A1 * | 1/2022 | Albero | H04L 41/147 |
| 2022/0180365 | A1 * | 6/2022 | McCarley | G06Q 20/3278 |

* cited by examiner

600

Monitor connection between first ATM and Application Servers — 610

First ATM online? — 620

Yes → Connect ATM directly to Application Servers over ATM communication network — 630

No - ATM Offline

Communicate banking transaction data via LoRaWAN Network and another online ATM — 640

1000

MONITOR STATE OF OPERATIONS OF LPWAN-ENABLED ATM — 1010

MAINTAIN RECORD OF STATE OF OPERATIONS DURING ATM OUTAGE IN A DATA STORE — 1020

USE RECORD TO RESUME BANKING TRANSACTION INITIATED BEFORE OUTAGE — 1030

AUTOMATED TELLER MACHINE (ATM) TRANSACTION RESILIENCY USING A LONG RANGE WIDE AREA NETWORK

FIELD OF THE DISCLOSURE

Aspects of the disclosure relate to increasing a resiliency of an automated teller machine (ATM) by providing connectivity between the ATM and a Low Power Wide Area Network (LPWAN) such as a long range WAN (LoRaWAN).

BACKGROUND OF THE DISCLOSURE

An ATM exchanges data with one or more application servers of a bank via an ATM communications gateway to an ATM communications network. The application servers at the bank may provide access to the applications for conducting ATM banking transactions. At times, however, the ATM may go offline and be unable to communicate with the bank application server via the ATM communication gateway. This may occur, for example, due to a hardware problem at the ATM such as hardware issue that prevents a user from accessing the ATM, making a deposit or withdrawal, and may require a technician to be dispatched to make repairs. The ATM may also go offline when there are other issues, such as when network infrastructure at the ATM fails, there are WiFi or network failures in the vicinity of the ATM, or software at the ATM has become corrupted. While an ATM is offline, the ATM is taken out of service and customers may have to inconveniently locate and travel to another ATM that is online, i.e., that remains operational to conduct banking transactions directly with one of the application servers at the bank.

Another issue that may sometimes prevent the completion of a banking transaction using the ATM may arise when the ATM suffers a momentary outage, such as a power outage, or a hardware or software glitch, such as a temporary malfunction. When with this happens, the ATM may lose track of the state of the transaction even though the interruption may have been brief and the customer to have to restart the transaction.

SUMMARY OF THE DISCLOSURE

It is an object of this invention to make the ATM resilient so that the customers may conduct banking transactions via an offline ATM in certain instances.

It is an object of this invention to make the ATM resilient to reduce the need to dispatch a technician to the ATM to effectuate in-person repairs.

It is an object of this invention to make the ATM resilient so that a momentary outage does not cause a loss of the transaction details by the ATM.

A computer program product in accordance with principles of the disclosure may include executable instructions that, when executed by a processor on a computer system, monitor a connection between a first ATM and one or more application servers of a bank over an ATM communications network to determine whether the connection over the ATM communications network is functioning to perform banking transactions using the first ATM and process the banking transactions at the application servers. The executable instructions may further exchange, between the first ATM and the one or more application servers, banking transaction data for the banking transactions requested by a user using the first ATM during an outage in the connection between the first ATM and the one or more application servers by routing the banking transaction data through a second ATM. The second ATM, which may be nearby, may remain in communication with the one or more application servers via an ATM communications network and in communication with the first ATM via a LoRaWAN network, thereby allowing continuing communications between the first ATM and the one or more application servers via the second ATM despite the outage in the connection between the first ATM and the one or more application servers. Each of the first ATM and the second ATM may have a respective module that enables communications between the first ATM and the second ATM using the LoRaWAN network. The second ATM that is used to route communications between the first ATM and the one or more applications servers may be selected from a plurality of ATMs, using the LoRaWAN network. The second ATM may thus act as a proxy for the first ATM.

The monitoring of the connection may include performing a periodic health check of the first ATM to determine whether the first ATM is connected to the ATM communications network. If an outage in the connection between the first ATM and the one or more application servers is detected, a notification may be transmitted, via the second ATM, to notify a module in communication with the ATM communications network of the outage.

A computer program product in accordance with further principles of the disclosure may include executable instructions that, when executed by a processor on a computer system, may detect an error in operations of a first ATM. The repair of the error may be initiated by obtaining first software or scripts to repair the error at the first ATM, using an ATM communications network between the first ATM when the first ATM is online such that the one or more application servers are reachable by the first ATM using the ATM communications network. The repair may be initiated automatically. When the first ATM is offline, the first ATM may communicate with a second ATM over a LoRaWAN network. The repair of the error may then be initiated automatically by obtaining second software or scripts (which may be the same or similar to the first software or scripts) from the second ATM, from a third ATM, or from one or more application servers to repair the error at the first ATM. The first ATM and the second ATM may be selected to be in a common region or time zone. The LoRaWAN module at the first ATM may include a semi-supervised machine learning module that may be used to detect an error type of the error detected at the first ATM. In embodiments, the error may be a fault, abnormality, or a change in behavior of the first ATM.

A computer program product in accordance with further principles of the disclosure may include executable instructions that, when executed by a processor on a computer system, may continuously monitor a state of operations of an automated teller machine (ATM) that includes a long range wide area network (LoRaWAN) module for the ATM to communicate with a LoRaWAN network. The executable instructions may further maintain a record of the state of operations of the ATM using the LoRaWAN module during an outage of the ATM, and may use the record of the state of operations of the ATM to enable the ATM to resume a previous banking transaction that was initiated at the ATM but not completed before the outage. In embodiments, the outage may be caused by one of a power outage, or a hardware or software glitch.

An ATM in accordance with principles of the disclosure may be used in performing banking transactions. The ATM may include a communications device for exchanging data related to the banking transactions between the ATM and one or more application servers that process the banking transactions over an ATM communications network, and a long range wide area network (LoRaWAN) module for the ATM to communicate with a LoRaWAN network. The ATM may further include a processor that directly exchanges the data related to the banking transactions between the ATM and the one or more application servers over the ATM communications network when the ATM is online such that the ATM is in direct communication with the one or more application servers over the ATM communications network. When the ATM is offline and unable to directly communicate with the one or more application servers over the ATM communications network, the processor exchanges the data related to the banking transactions with the one or more application servers by routing communications through the LoRaWAN network and a second ATM that is online and in communication with the one or more application servers. The processor of the ATM may be configured to obtain, using the LoRaWAN network, software or scripts to repair or rebuild the ATM, if necessary, when that the ATM has become unable to directly communicate over the ATM communications network.

The LoRaWAN module of the ATM may be configured to continuously monitor a state of operations of the ATM, maintain a record of the state of operations of the ATM using the LoRaWAN module during an outage of the ATM, and use the record of the state of operations to enable the ATM to resume a previous banking transaction that was initiated at the ATM but not completed before the outage. The first and second ATMs may be in a common region or time zone. The LoRaWAN network may be used to transmit data between ATMs and one or more application servers to determine the second ATM to be used from a plurality of available ATMs.

An ATM in accordance with principles of the disclosure may be used in performing banking transactions. The ATM may include a communications device for exchanging data related to the banking transactions between the ATM and one or more application servers that process the banking transactions over an ATM communications network, and a long range wide area network (LoRaWAN) module for the ATM to communicate with a LoRaWAN network via the LoRaWAN module. The ATM may be configured for the data related to the banking transactions to be exchanged over the network when the ATM is online such that the ATM is able to communicate with the one or more application servers over the ATM communications network. The ATM may be configured to receive, via the LoRaWAN network, a transmission comprising data from a second ATM that is offline such that the second ATM is unable to communicate directly with the one or more application servers over the ATM communications network, and, when the ATM is online, to exchange the data related to the banking transactions between the second ATM and the one or more application servers over the ATM communications network, such that communications between the second ATM and the one or more application servers are maintained.

An ATM in accordance with principles of the disclosure may be used in performing banking transactions. The ATM may include a communications device for exchanging data between the ATM and one or more application servers over an ATM communications network, a long range wide area network (LoRaWAN) module for the ATM to communicate with a LoRaWAN network, and a processor. The processor may be configured to detect an error in operations of the ATM, attempt to reach at least one of the one or more application servers via the ATM communications network when the error is detected at the ATM and to obtain from the at least one of the one or more application servers first software or scripts to repair the error when the at least one or more application servers are reachable by the ATM using the ATM communications network. The processor may attempt to connect to a second ATM via the LoRaWAN network and obtain second software or scripts to repair the error when the ATM is unable to directly communicate with the one or more application servers over the ATM communications network. The LoRaWAN module of the ATM may include a semi-supervised machine learning module to detect an error type of the error detected at the ATM. In embodiments, the error may be one of a fault, abnormality, or a change in behavior of the ATM. The first and second ATMs may be located in a common region or time zone.

An ATM in accordance with principles of the disclosure may be used in performing banking transactions. The ATM may include a communications device for exchanging data between the ATM and one or more application servers over an ATM communications network, a long range wide area network (LoRaWAN) module for the ATM to communicate with a LoRaWAN network, and a processor. The processor may be configured to monitor a state of operations of the ATM, maintain a record of the state of operations of the ATM using the LoRaWAN module during an outage of the ATM, and use the record of the state of operations of the ATM to enable the ATM to resume a previous banking transaction that was initiated at the ATM but not completed before the outage. In embodiments, the outage may be caused by one of a power outage, or a hardware or software glitch.

BRIEF DESCRIPTION OF THE DRAWINGS

The objects and advantages of the disclosure will be apparent upon consideration of the following detailed description, taken in conjunction with the accompanying drawings, in which like reference characters refer to like parts throughout, and in which.

DETAILED DESCRIPTION OF THE DISCLOSURE

The present disclosure relates to an LPWAN-enabled ATM that may be equipped with a LoRaWAN (LoRa) module. The term LPWAN is used herein interchangeably with the term LoRaWAN to refer to a low power, long range network that uses a protocol for bidirectional communications via a LoRaWAN network. The LoRaWAN module at the ATM may have a chip with a sensor and may communicate with other LoRaWAN enabled devices using a LoRaWAN gateway into the LoRaWAN network.

Providing the ATM with LoRaWAN connectivity may be used to improve the resiliency of the ATM. For example, a LoRaWAN sensor may be used by an offline ATM that has lost connectivity to one or more application servers at a bank to communicate with one or more of the application servers via another nearby ATM that is online, as described below. The LoRaWAN capability may also be used to enable an automated rebuild, reimage or repair of an ATM when necessary. Moreover, the LoRaWAN module may be used to record steps of a transaction in a data store (memory) so that, if there is a momentary ATM outage, such as may be caused by a power outage or some other brief interruption in service, an ATM transaction may be resumed after the outage by referencing the LoRaWAN module. The present disclosure further relates to computer program products and methods that use a LoRaWAN module to provide enhanced functionality at the ATM.

Illustrative embodiments of methods, systems, and apparatus in accordance with the principles of the invention will now be described with reference to the accompanying drawings, which form a part hereof. It is to be understood that other embodiments may be used, and structural, functional, and procedural modifications may be made without departing from the scope and spirit of the present invention.

The drawings show illustrative features of methods, systems, and apparatus in accordance with the principles of the invention. The features are illustrated in the context of selected embodiments. It will be understood that features shown in connection with one of the embodiments may be practiced in accordance with the principles of the invention along with features shown in connection with another of the embodiments.

The computer program products, methods, systems, and apparatus described herein are illustrative. The computer program products, methods, systems, and apparatus of the invention may involve some or all of the steps of the illustrative methods and/or some or all of the features of the illustrative system or apparatus. The steps of the methods may be performed in an order other than the order shown or described herein. Some embodiments may omit steps shown or described in connection with the illustrative methods. Some embodiments may include steps that are not shown or described in connection with the illustrative methods, but rather are shown or described in a different portion of the specification.

Figure 1:
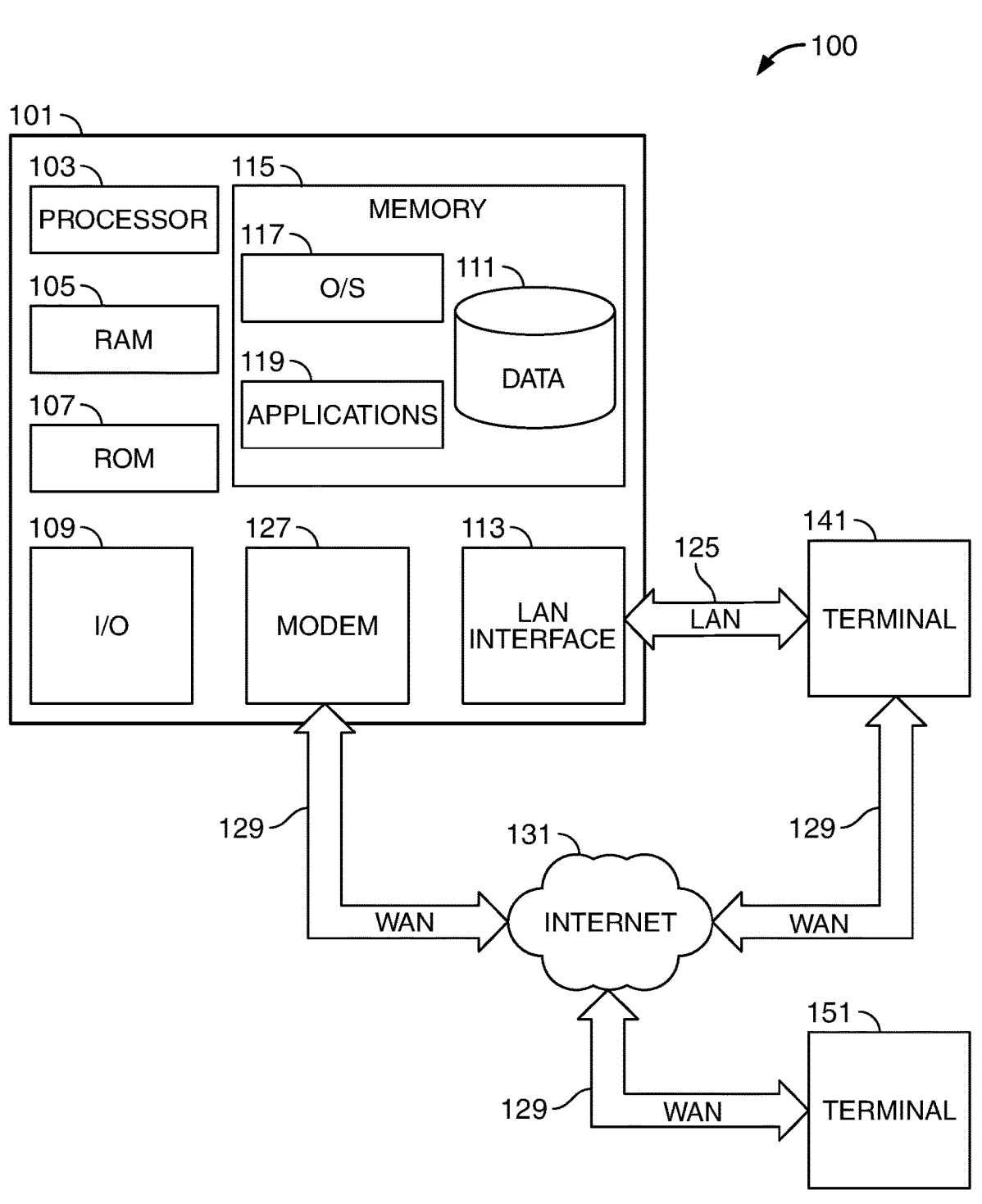
FIG. 1 shows an illustrative system architecture in accordance with principles of the disclosure.

FIG. 1 shows an illustrative block diagram of system 100 that includes computer 101. Computer 101 may alternatively be referred to herein as an "engine," "server" or a "computing device." Computer 101 may be any computing device described herein, such as the computing devices running on a computer, smart phones, smart cars, smart cards, and any other mobile device described herein. Elements of system 100, including computer 101, may be used to implement various aspects of the systems and methods disclosed herein.

Computer 101 may have a processor 103 for controlling the operation of the device and its associated components, and may include RAM 105, ROM 107, input/output circuit 109, and a non-transitory or non-volatile memory 115. Machine-readable memory may be configured to store information in machine-readable data structures. Other components commonly used for computers, such as EEPROM or Flash memory or any other suitable components, may also be part of the computer 101.

The memory 115 may be comprised of any suitable permanent storage technology—e.g., a hard drive. The memory 115 may store software including the operating system 117 and application(s) 119 along with any data 111 needed for the operation of computer 101. Memory 115 may also store videos, text, and/or audio assistance files. The data stored in Memory 115 may also be stored in cache memory, or any other suitable memory.

Input/output ("I/O") module 109 may include connectivity to a microphone, keyboard, touch screen, mouse, and/or stylus through which input may be provided into computer 101. The input may include input relating to cursor movement. The input/output module may also include one or more speakers for providing audio output and a video display device for providing textual, audio, audiovisual, and/or graphical output. The input and output may be related to computer application functionality.

Computer 101 may be connected to other systems via a local area network (LAN) interface 113. Computer 101 may operate in a networked environment supporting connections to one or more remote computers, such as terminals 141 and 151. Terminals 141 and 151 may be personal computers or servers that include many or all of the elements described above relative to computer 101.

In some embodiments, computer 101 and/or Terminals 141 and 151 may be any of mobile devices that may be in electronic communication with consumer device 106 via LAN, WAN or any other suitable short-range communication when a network connection may not be established.

When used in a LAN networking environment, computer 101 is connected to LAN 125 through a LAN interface 113 or an adapter. When used in a WAN networking environment, computer 101 may include a communications device, such as modem 127 or other means, for establishing communications over WAN 129, such as Internet 131.

In some embodiments, computer 101 may be connected to one or more other systems via a short-range communication network (not shown). In these embodiments, computer 101 may communicate with one or more other terminals 141 and 151, such as the mobile devices described herein etc., using a personal area network (PAN) such as Bluetooth®, NFC, ZigBee, or any other suitable personal area network.

It will be appreciated that the network connections shown are illustrative and other means of establishing a communications link between computers may be used. The existence of various well-known protocols such as TCP/IP, Ethernet, FTP, HTTP and the like is presumed, and the system can be operated in a client-server configuration to permit retrieval of data from a web-based server or API. Web-based, for the purposes of this application, is to be understood to include a cloud-based system. The web-based server may transmit data to any other suitable computer system. The web-based server may also send computer-readable instructions, together with the data, to any suitable computer system. The computer-readable instructions may be to store the data in cache memory, the hard drive, secondary memory, or any other suitable memory.

Additionally, application program(s) 119, which may be used by computer 101, may include computer executable instructions for invoking functionality related to communication, such as e-mail, Short Message Service (SMS), and voice input and speech recognition applications. Application program(s) 119 (which may be alternatively referred to herein as "plugins," "applications," or "apps") may include computer executable instructions for invoking functionality related to performing various tasks. Application programs 119 may use one or more algorithms that process received executable instructions, perform power management routines or other suitable tasks.

Application program(s) 119 may include computer executable instructions (alternatively referred to as "programs"). The computer executable instructions may be embodied in hardware or firmware (not shown). The computer 101 may execute the instructions embodied by the application program(s) 119 to perform various functions.

Application program(s) 119 may use the computer-executable instructions executed by a processor. Generally, programs include routines, programs, objects, components, data structures, etc. that perform particular tasks or implement particular abstract data types. A computing system may be operational with distributed computing environments where tasks are performed by remote processing devices that are linked through a communications network. In a distributed computing environment, a program may be located in both local and remote computer storage media including memory storage devices. Computing systems may rely on a network of remote servers hosted on the Internet to store, manage, and process data (e.g., "cloud computing" and/or "fog computing").

One or more of applications 119 may include one or more algorithms that may be used to implement features of the disclosure.

The invention may be described in the context of computer-executable instructions, such as applications 119, being executed by a computer. Generally, programs include routines, programs, objects, components, data structures, etc., that perform particular tasks or implement particular data types. The invention may also be practiced in distributed computing environments where tasks are performed by remote processing devices that are linked through a communications network. In a distributed computing environment, programs may be located in both local and remote computer storage media including memory storage devices. It should be noted that such programs may be considered, for the purposes of this application, as engines with respect to the performance of the particular tasks to which the programs are assigned.

Computer 101 and/or terminals 141 and 151 may also include various other components, such as a battery, speaker, and/or antennas (not shown). Components of computer system 101 may be linked by a system bus, wirelessly or by other suitable interconnections. Components of computer system 101 may be present on one or more circuit boards. In some embodiments, the components may be integrated into a single chip. The chip may be silicon-based.

Terminal 151 and/or terminal 141 may be portable devices such as a laptop, cell phone, Blackberry™, tablet, smartphone, or any other computing system for receiving, storing, transmitting and/or displaying relevant information. Terminal 151 and/or terminal 141 may be one or more user devices. Terminals 151 and 141 may be identical to computer 101 or different. The differences may be related to hardware components and/or software components.

The invention may be operational with numerous other general purpose or special purpose computing system environments or configurations. Examples of well-known computing systems, environments, and/or configurations that may be suitable for use with the invention include, but are not limited to, personal computers, server computers, handheld or laptop devices, tablets, and/or smartphones, multiprocessor systems, microprocessor-based systems, cloud-based systems, programmable consumer electronics, network PCs, minicomputers, mainframe computers, distributed computing environments that include any of the above systems or devices, and the like.

Figure 2:
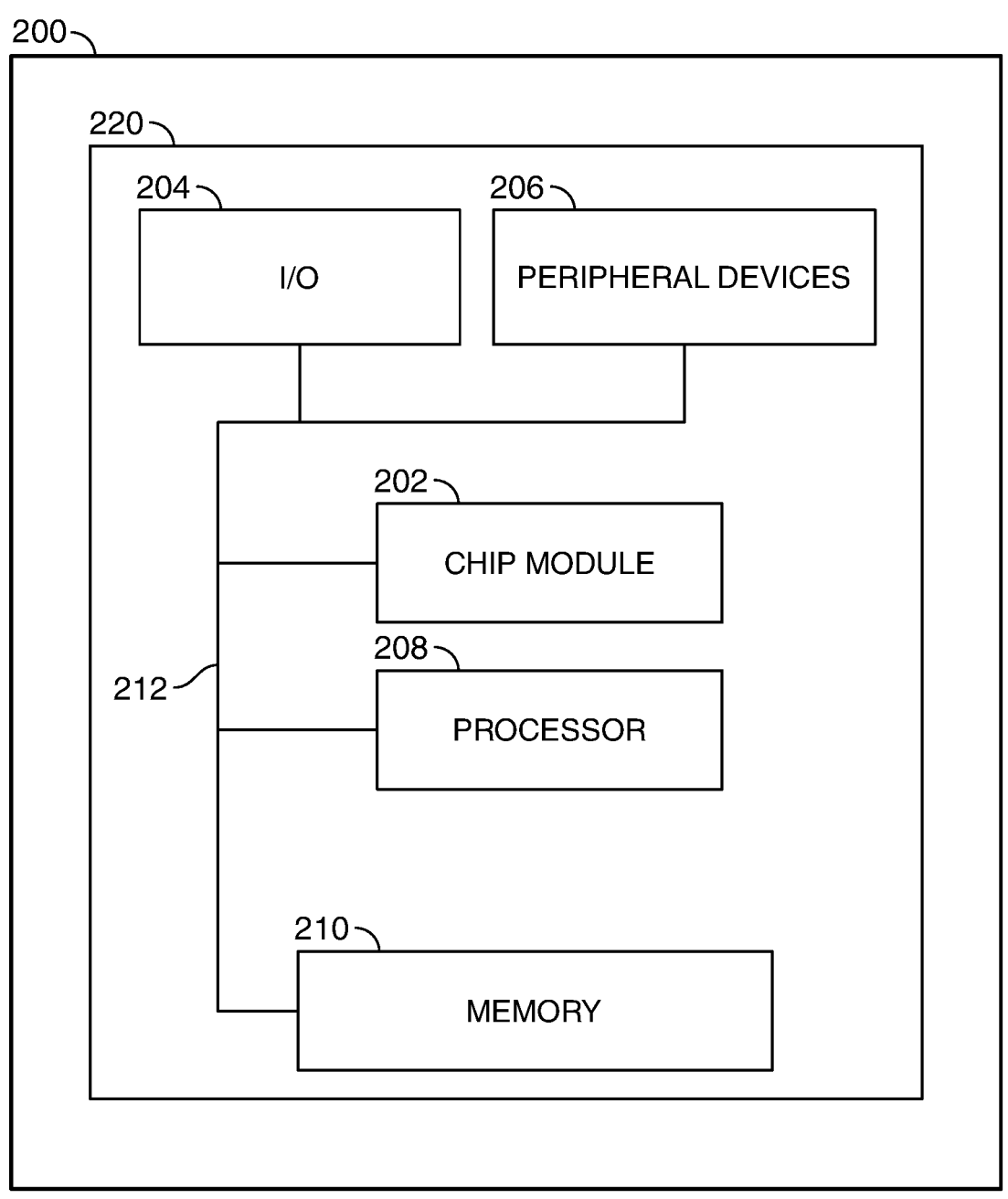
FIG. 2 shows an illustrative apparatus of a device in accordance with principles of the disclosure.

FIG. 2 shows illustrative apparatus 200 that may be configured in accordance with the principles of the disclosure. Apparatus 200 may be a computing device. Apparatus 200 may include chip module 202, which may include one or more integrated circuits, and which may include logic configured to perform any other suitable logical operations.

Apparatus 200 may include one or more of the following components: I/O circuitry 204, which may include a transmitter device and a receiver device and may interface with fiber optic cable, coaxial cable, telephone lines, wireless devices, PHY layer hardware, a keypad/display control device or any other suitable media or devices; peripheral devices 206, which may include counter timers, real-time timers, power-on reset generators or any other suitable peripheral devices; logical processing device 208, which may compute data structural information and structural parameters of the data; and machine-readable memory 210.

Machine-readable memory 210 may be configured to store in machine-readable data structures: machine executable instructions, (which may be alternatively referred to herein as "computer instructions" or "computer code"), applications such as applications 219, signals, and/or any other suitable information or data structures.

Components 202, 204, 206, 208 and 210 may be coupled together by a system bus or other interconnections 212 and may be present on one or more circuit boards such as circuit board 220. In some embodiments, the components may be integrated into a single chip. The chip may be silicon-based.

Figure 3:
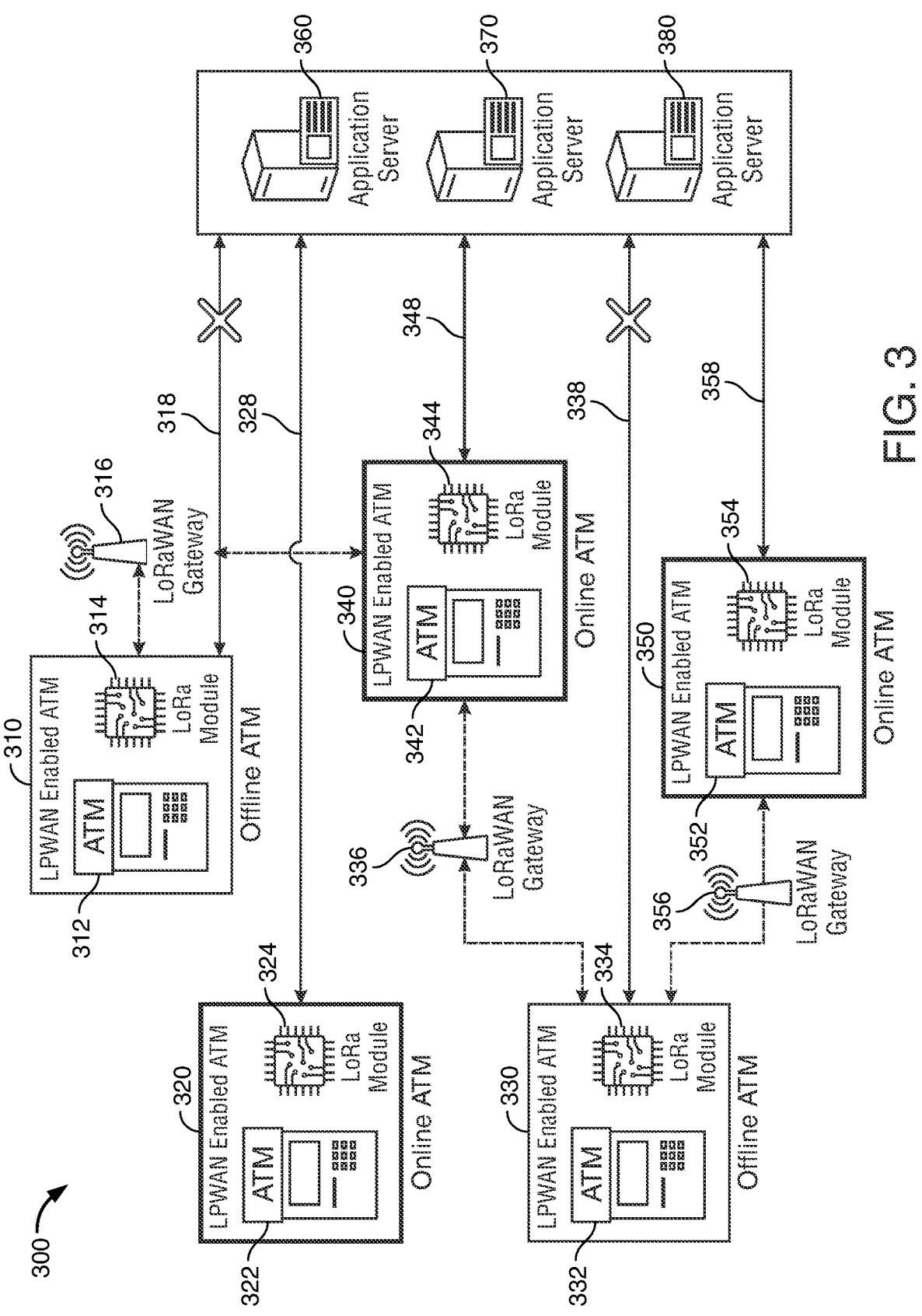
FIG. 3 shows an illustrative example of a system including LoRaWAN-enabled ATMs in communication with application servers in accordance with principles of the disclosure.

FIG. 3 shows an illustrative example of a system 300 that includes a network of ATMs in communication with one or more application servers (bank servers) in accordance with principles of the disclosure. Each ATM may be used by a user to perform a banking transaction, such as on a user interface at the ATM or by using a device to interact with an ATM. The application servers may be provided to perform the banking transactions requested using the ATM. The ATMs may connect to the one or more application servers through an ATM communications network and an ATM communication gateway to the one or more application servers.

The ATMs may be LPWAN-enabled by including at each ATM may a LoRaWAN (LoRa) module that may have a chip with a processor that is programmed to enable bidirectional wireless communications between the ATM and a LoRaWAN network. These communications are in addition to the communications that are conducted using the ATM communications network. The LoRaWAN module may include one or more LoRaWAN sensors at the module and a LoRaWAN network via one or more LoRaWAN gateways. The LoRaWAN chip may be capable of functioning almost continuously while almost never or rarely going out of service, such as with the use of long life batteries.

Communications over the LoRaWAN network may be advantageously leveraged in various ways to enhance the resiliency of the ATMs. The LoRaWAN module at a first ATM may be used to communicate with a second ATM to direct banking transactions through the second ATM as a proxy to application servers of a bank when a direct connection between the first ATM and the application servers is not functioning. In addition, the LoRaWAN module at the first ATM may be used to obtain software to repair or rebuild the ATM when an error, such as an abnormality or a change in behavior of the ATM or a fault code, is detected. A processor at the ATM may include a machine learning module, such as a semi-supervised machine learning module, that learns to identify different variations in errors from different ATMs. The LoRaWAN module may also be used to monitor and save, at least temporarily, one or more states of operation of the ATM so that if a banking transaction is interrupted by a brief outage in service, such as a power outage or a hardware or software glitch, the transaction may be resumed from the last state where the transaction was interrupted without having to restart the transaction from the beginning.

For illustrative purposes, five LPWAN (LoRaWAN)-enabled ATMs 310, 320, 330, 340, 350 and three application servers 360, 370, 380 are shown in FIG. 3. However, any number of ATMs and application servers may be included in system 300. Each of the ATMs 310, 320, 330, 340, 350 may include a network interface to the ATM communications network over which data may be transmitted over the network between a respective ATM and one or more of the application servers.

In the example of FIG. 3, the ATM communications network may include five communications links 318, 328, 338, 348, 358 that connects a respective ATM with one or more of application servers 360, 370, 380. In the illustrated example, three links 328, 348, 358 are shown as active and the other links 318, 338 are shown as non-operational for whatever reason. ATMs 320, 330, 350 which may directly communicate with an application server of a bank over an active link may be referred to herein as an "online ATM." Direct communications with one or more of application servers 360, 370, 380 may be performed by a respective online ATM over the ATM communications network using an operational communications link. Thus, banking transactions may be performed at an online ATM that may conduct direct communications with an application server. An ATM that does not have an active direct link with an application server at the bank may be referred to as an "offline ATM."

Each of the ATMs, in accordance with principles of the present disclosure, may further include a low power WAN (LPWAN) module/sensor, which may be a LoRaWAN module/sensor, that enables an additional communications link that may be used to connect to an LPWAN network infrastructure. This infrastructure may include one or more LPWAN (LoRaWAN) gateways, such as gateways 316, 336, 356. In an LPWAN-enabled ATM, the LoRaWAN gateways may be used to communicate with one or more of application servers 360, 370, 380 over LPWAN infrastructure even when the ATM is offline from the main ATM communications network. LPWAN infrastructure, that allows for LoRaWAN communication, provides wireless communications over a relatively long range of several miles, such as approximately 3-10 miles depending on the location.

The resilient operation of ATM 310 may be understood from FIG. 3. For example, ATM 310 is normally linked with application servers 360, 370, 380 via link 318 that connects via the ATM communications network. However, ATM 310 may be offline due to a disruption in which the ATM 310 is prevented from communicating with the application servers. In this event, ATM 310 may be configured to use its LoRaWAN module 314 to communicate with LoRaWAN gateway 316 that may arrange a connection to a nearby LPWAN-enabled ATM that is online, such as ATM 340, that also communicates with LoRaWAN gateway 316 via its own LoRaWAN module 344. The LoRaWAN network is configured to exchange communications between ATM 310 and ATM 340. With this arrangement, a transaction that is initiated at ATM 310 when it is offline may be transmitted to ATM 340, and ATM 340 may then transmit the banking transaction information from ATM 310 over link 348 to one of the application servers 360, 370, 380. Thus, ATM 340 may act as a proxy for ATM 310. The data that is transmitted may include information to track identities of the offline ATM 310 and the proxy ATM 340. An application server may also transmit a communication back to ATM 310 through ATM 340 via link 348. ATM 340 may then transmit the communication from the application server, using LoRaWAN module 344 and LoRaWAN gateway 316, to ATM 310.

Similarly, offline ATM 330 may be able to communicate with one of the application servers using a LoRaWAN gateway. In this illustrative example, there may be two or more available online ATMs, such as ATMs 340 and 350 near ATM 330. Each of ATMs 330, 340 may have its own respective LoRaWAN module 344 (also usable to communicate with ATM 310) and 354. ATM 330 may communicate with ATM 340 using LoRaWAN module 334 at ATM 330 and LoRaWAN module 344 at ATM 340 to conduct bidirectional communications via LoRaWAN gateway 336. ATM 350 may also have its own respective LoRaWAN module 354. ATM 330 may communicate with ATM 350 using LoRaWAN module 334 at ATM 330 and LoRaWAN module 354 at ATM 350 to conduct bidirectional communications with LoRaWAN gateway 356. The selection of which of ATMs 330 or 350 to be used by ATM 330 to communicate with one of the application servers may be made by the LoRaWAN network. Factors in deciding which ATM to use may be based on, for example, load balancing across ATMs, whether ATM 340 is already in use by an in-person user or by another offline ATM, e.g., ATM 310, to communicate with the application servers, the strength of the LoRaWAN signals, distance between ATMs, a round robin selection process to use a different available online ATM each time one is needed, or other factors. In other embodiments, ATM 330 may select which one of ATMs 340, 350 to use.

Figure 4:
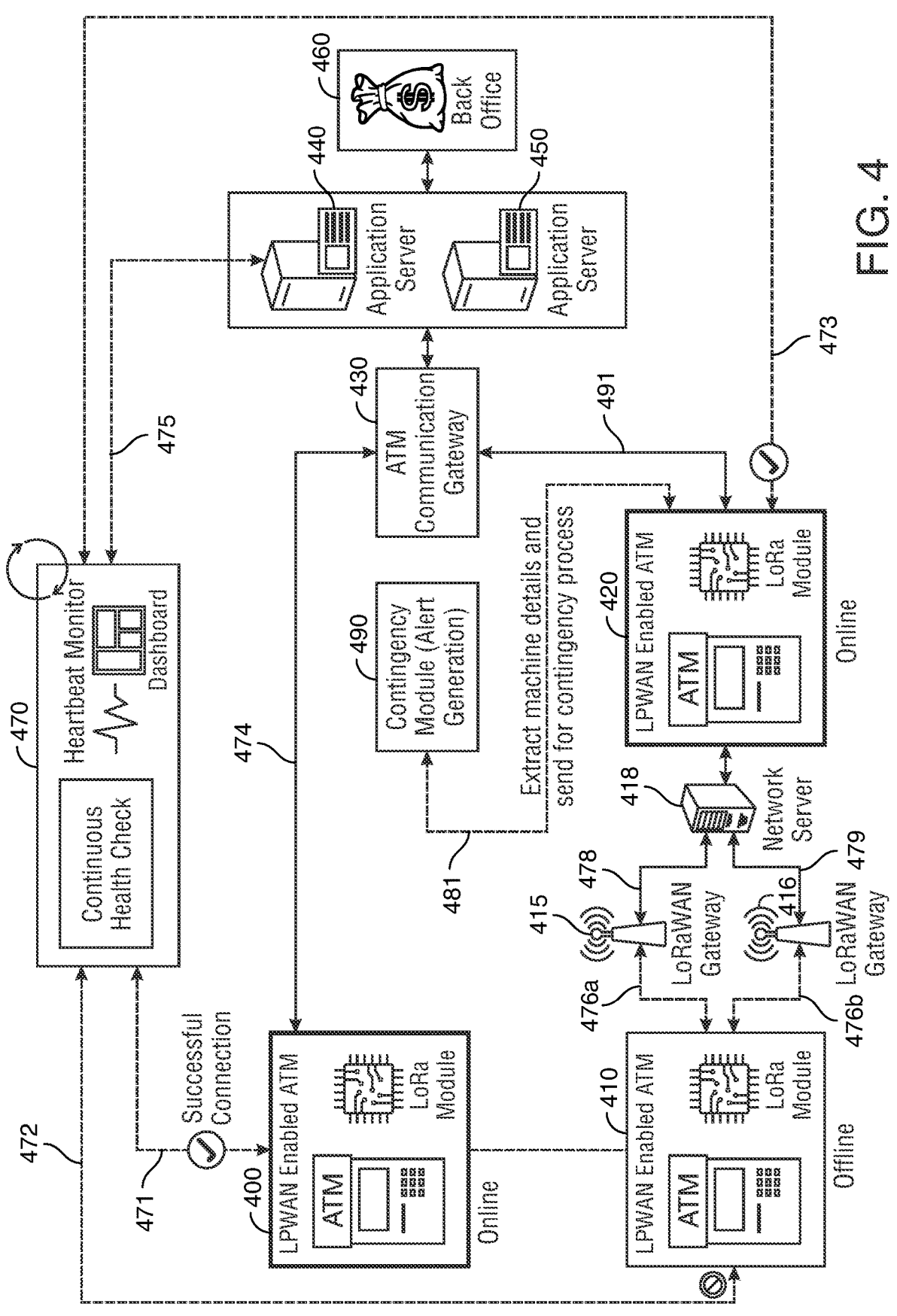
FIG. 4 shows another illustrative example of a system including LoRaWAN-enabled ATMs in communication with application servers in accordance with principles of the disclosure.

FIG. 4 illustrates additional details of exemplary operations that may be performed at a network of LPWAN-enabled ATMs that may be in communication with application servers either via direct links in an ATM communications network, when the links are operational, or via LPWAN infrastructure, including LoRaWAN modules at the respective ATMs, that link one ATM to another, nearby ATM.

In FIG. 4, three LPWAN-enabled ATMs 400, 410, 420 are shown. ATMs 400 and 420 may be online and ATM 410 may be offline in this example. A heartbeat monitor 470 may be provided at the ATM communications network to perform a health check on the ATMs to continuously monitor the ATMs to check that they are functioning properly, and may also monitor the health of application servers 440, 450 of the bank application servers via respective communication links 471, 472, 473, 475. The heartbeat monitor 470 may perform the health check by continuously exchanging sample data packets with the ATMs that attempt to validate whether each ATM in the ATM network is functioning properly and is connected to the ATM communications network. The heartbeat monitor 470 may be locally installed, such as within a local ATM network or it may be installed elsewhere but in communication with the ATMs. The heartbeat monitor 470 may discover that some ATMs, such as ATMs 400 and 420 are online, and that other ATMs, such as ATM 410, are offline. For ATMs that are determined to be online, heartbeat monitor 470 or another component of the ATM communications network may be used to receive details required for authentication of an ATM to allow the ATM to communicate with the application servers and to validate and transfer requests to application servers 440, 450 and to transfer responses back to the ATMs.

ATM 400, which is online, may communicate directly over a link 474 to access the ATM communications network via ATM communication gateway 430 to communicate with application servers 440, 450. Likewise, ATM 420, which may also be online, may similarly directly access ATM communications gateway 430 to reach application servers 440, 450.

Application servers 440, 450 may be connected to a bank's back office systems 460 that execute the banking transactions. The back office systems 460 may, for example, provide authorizations, initiate disbursements, generate settlements of transactions, and process any disputes.

ATM 410 may be offline and communicate with nearby ATM 420 via a LoRaWAN gateway. Where there are multiple accessible LoRaWAN gateways 415, 416, one of the gateways may be selected for communications by ATM 410 or ATM 410 may choose to communicate with both LoRaWAN gateway 415, 416 via respective links 476a, 476b, and allow the LoRaWAN network to use a network server 418 to determine which of the two LoRaWAN gateways that ATM 410 should use. Network server 418 may filter duplicate requests, if requests are sent over both LoRaWAN gateways 415, 416, and arrange for offline ATM 410 to connect to LPWAN-enabled ATM 420, which is connected to application servers 440, 450.

ATM 410 may use one of the LoRaWAN gateways 415, 416 to transmit data packets to another ATM, e.g., ATM 420, to enable transactions with application servers 440, 450. In addition to bank account information and transaction information, the data packets generated by ATM 410 and transmitted through the LoRaWAN network may include, for example, the unique machine IDs of ATM 410 and ATM 420 for data security purposes, and authentication details to establish a connection with ATM 420 (e.g., details to establish the connection between ATMs 410, 420). The machine IDs of ATM 410 and ATM 420 may be transmitted to application servers 440, 450 to track where the transaction originated and to track which ATM is serving a proxy and to direct a response to a transmission from ATM 410 from one or more of the application servers 440, 450 through ATM 420 and back to the originating ATM 410. The machine ID for ATM 410 may also be used for contingency purposes to be able to send a notification, which may include failure metadata, that ATM 410 is offline and requires repair.

An ATM that is online (e.g., ATM 420) and may be used to transmit data from an offline ATM may also connect to a contingency module 490 over link 481 to generate the notification that ATM 410 may require repair. The notification may be provided to an automated service agent that tracks what repairs need to be performed or the notification may be transmitted in some other manner to a repair center.

Figure 5:
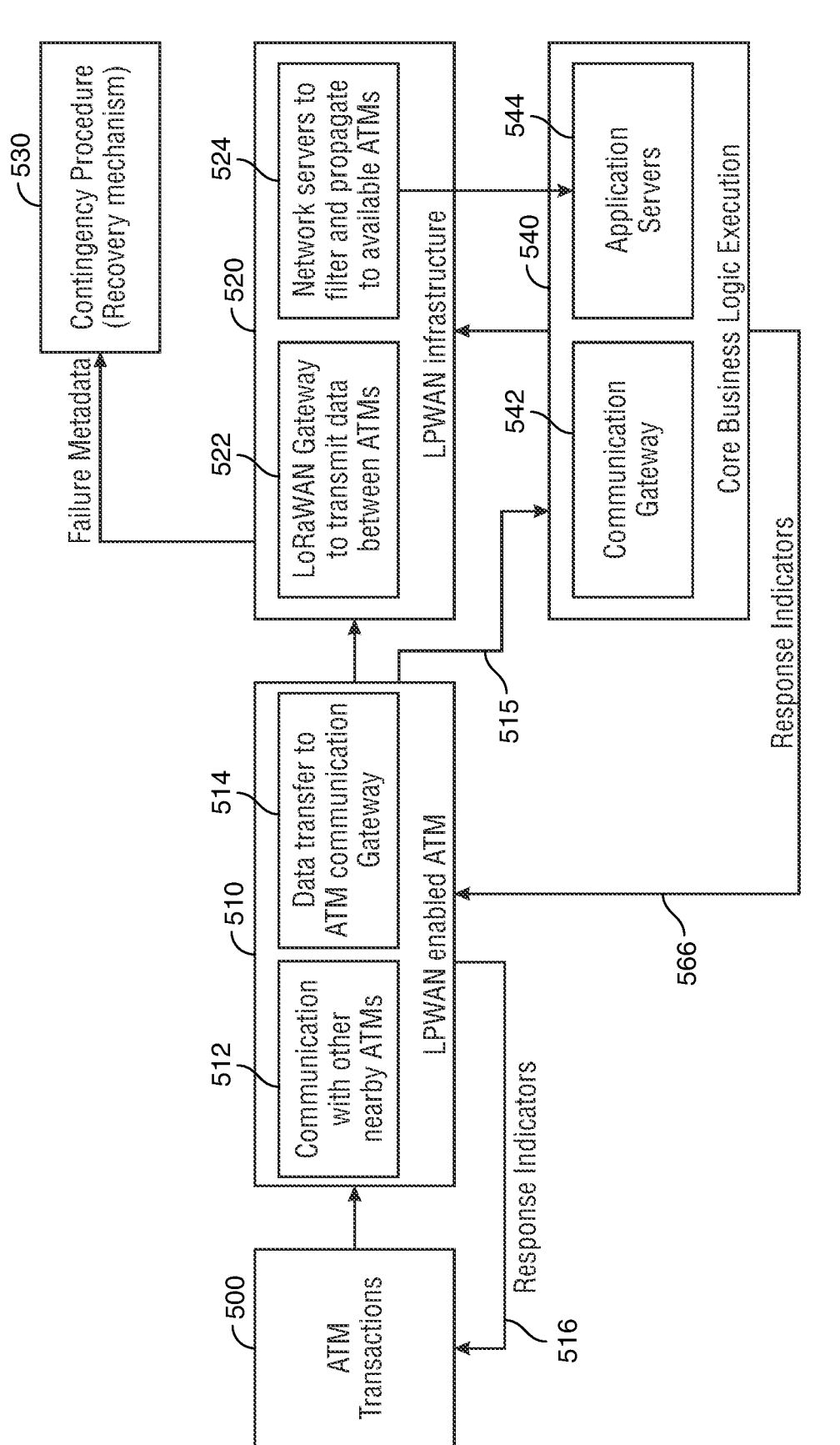
FIG. 5 shows illustrative communications between the LoRaWAN-enabled ATMs and the applications servers in accordance with principles of the invention.

FIG. 5 shows an illustrative workflow for communications between an offline ATM and application servers. One or more ATM banking transactions may be initiated by a customer at 500. The requests for the banking transactions may be made using an LPWAN-enabled ATM 510 that may transmit data 514 through a communications network directly to a communications gateway 542. The requests may be made via a device (not shown), such as, for example, a mobile device, smart card, or smart glasses, or may be performed directly at a user interface (not shown) at ATM 510. If it is operational, core business logic execution may be performed on the data at 540 at ATM communication gateway 542 and application servers 544. Once core business logic execution is performed at 540, response indicators may be returned to LPWAN-enabled ATM 510.

ATM 510 may also be enabled to communicate with nearby ATMs through LoRaWAN infrastructure that may include a LoRaWAN gateway. If ATM 510 is offline, data may be transmitted to LPWAN infrastructure 520. LPWAN infrastructure 520 may include LoRaWAN gateway 522 to transmit data between ATMs and may further include network servers to filter and propagate the data to one or more other available ATMs that are online. LPWAN infrastructure 520 may further forward data, e.g., failure metadata that indicates that ATM 510 requires repair, to initiate a contingency procedure 530 that provides a recovery mechanism.

In addition to enabling the routing banking transactions from an offline ATM to an online ATM for providing continuous, resilient banking operations, the LPWAN technology may be used to try to automatically fix an ATM that encounters an error, such as a software error. This may be an error that has caused an ATM to go offline, or it may be a different error or errors. This attempt at error correction may be in addition to reporting an error to a contingency module noted above. The attempt to correct the error may involve transmitting instructions, such as scripts, or software that may be used to initiate an automated repair, such as a rebuild, reimage, or repair operation at the ATM.

Figure 6:
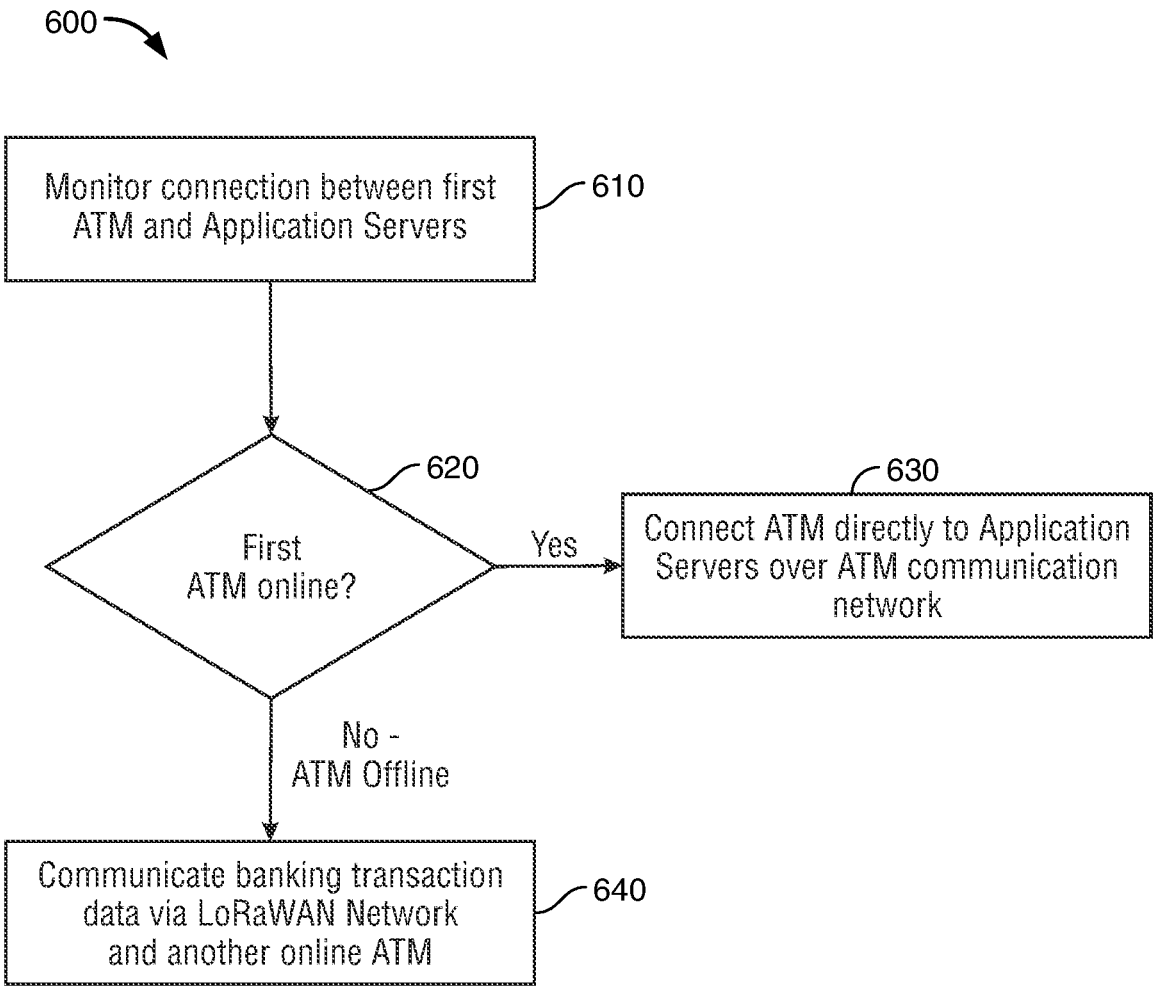
FIG. 6 shows an illustrative flow chart of steps that may be performed to maintain communications between offline LoRaWAN-enabled ATMs and application servers in accordance with principles of the invention.

FIG. 6 illustrates a flow chart 600 of method steps that may be performed to provide ATM resiliency in accordance with principles of the disclosure. At step 610, a connection between a first ATM, such as ATM 510, and one or more application servers of the bank may be monitored. The monitoring may include performing a health check of the ATM and may further include a health check of the application servers. At step 620, the method determines whether the ATM is online and may conduct communications directly with the one or more application servers without the assistance of another ATM. At step 630, if communications may be directly conducted, banking transactions performed using the ATM may proceed over an ATM communications network. If the ATM is determined to be offline such that banking transaction cannot be performed by the ATM via the ATM communications network, at step 640, the ATM may try to establish communications with the one or more application servers using the LoRaWAN network. The ATM may use its LoRaWAN module to communicate with a LoRaWAN network, via a LoRaWAN gateway, to request a connection to another ATM that is online and able to communicate with the one or more applications servers of the bank via the ATM communications network. The LoRaWAN infrastructure may find a suitable nearby online LPWAN-enabled ATM that may be available (generally an ATM that is not in use itself), and may enable the exchange of banking transaction data between the first ATM and the application servers via the LoRaWAN network and the second ATM.

The LoRaWAN network may have multiple nearby LPWAN-enabled ATMs. The LoRaWAN network may choose one of the nearby ATMs through which to conduct communications with the one or more application servers. There may sometimes be multiple offline ATMs that simultaneously require access to nearby online ATMs to continue banking transactions. The LoRaWAN network may then be able to assign an offline ATM to an available online ATM. By enabling ongoing banking operations to continue at offline ATMs, the LPWAN-enabled ATMs provide ATM network resiliency.

Figure 7:
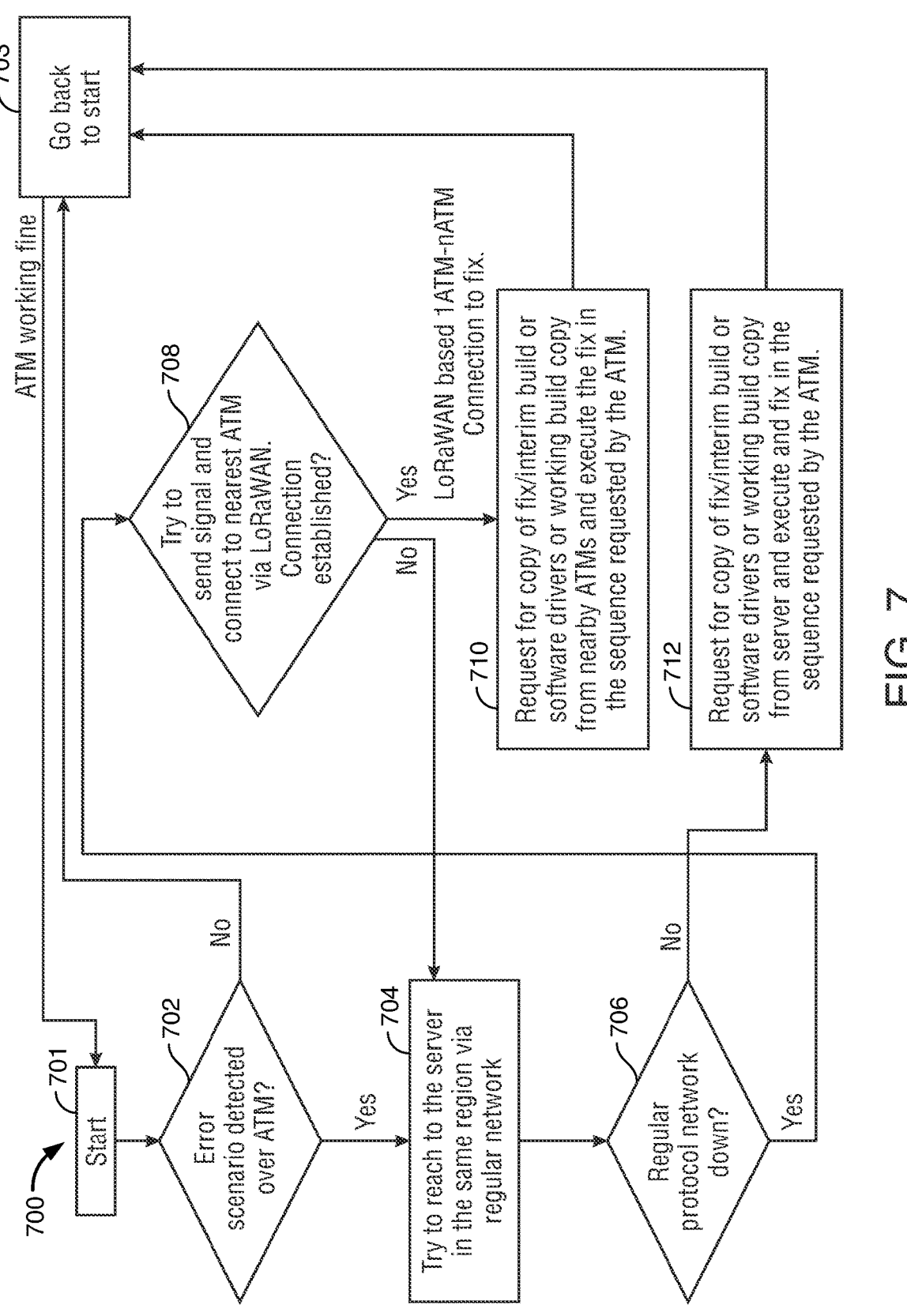
FIG. 7 shows an illustrative flow chart for using LoRaWAN infrastructure to maintain communications between LoRaWAN-enabled ATMs and application servers and to rebuild, reimage, or repair faulty ATMs using a LoRaWAN network in accordance with principles of the invention.
Figures 8A, 8B:
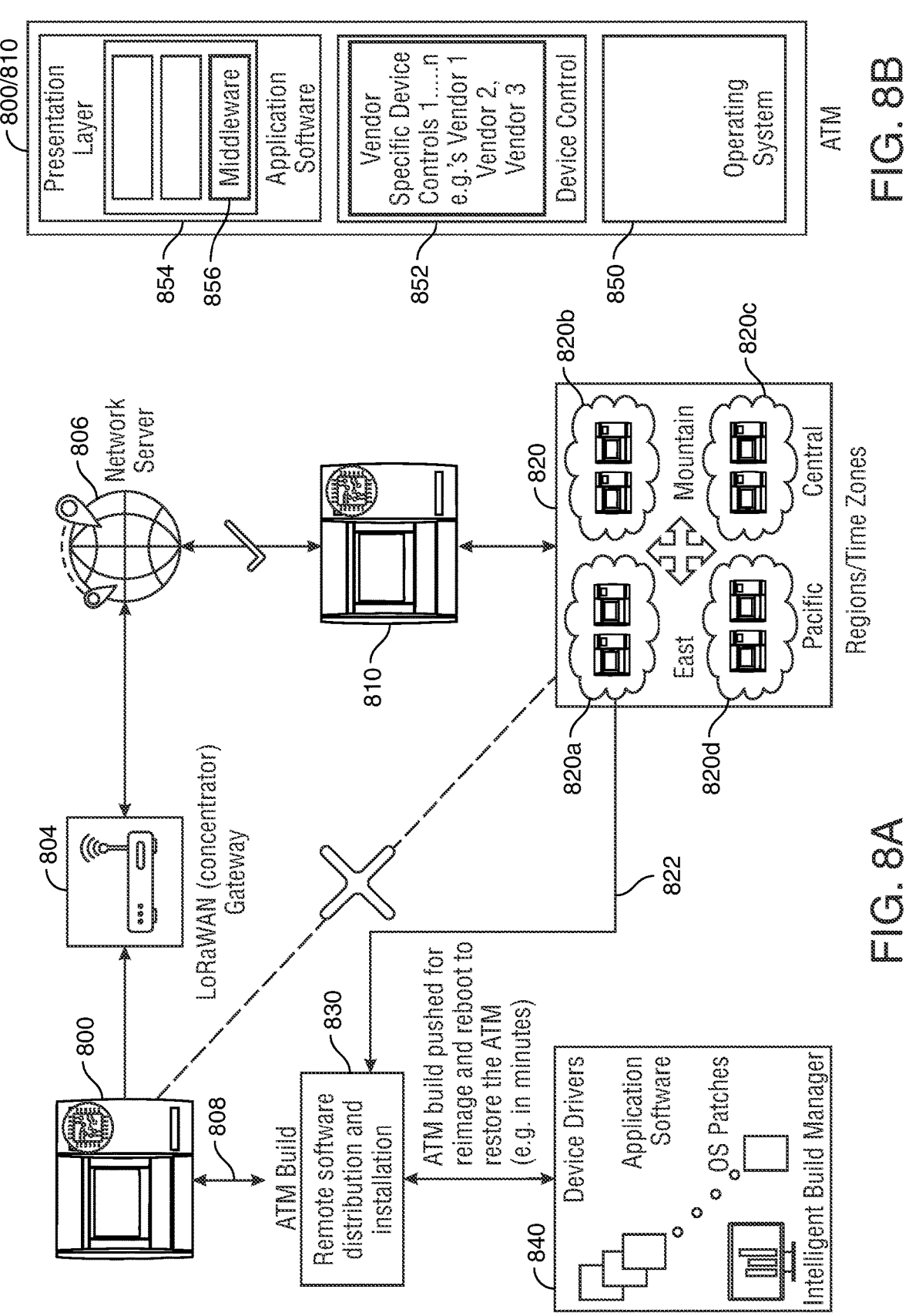
FIG. 8A shows an illustrative system that uses a LoRaWAN network to reimage and repair faulty ATMs in accordance with principles of the invention.
FIG. 8B shows illustrative software that may be provided for use in rebuilding an ATM in accordance with principles of the disclosure.

Another possible use for a LoRaWAN module at an ATM is illustrated with respect to FIGS. 7, 8A, and 8B. In this scenario, the ATM or a device in communication with the ATM may determine that there a software error has occurred at the ATM and attempts to automatically repair the error.

FIG. 7 shows a flow chart 700 to automatically monitor and fix errors at ATMs. At step 702, the ATM performs error checks to monitor for errors at the ATM. This may be part of the health check operation described above. The process may be performed continuously. An error may occur for a variety of reasons. Software may become unresponsive or may get corrupted due to, for example, a hardware malfunction, a mismatch between device drivers, dirty power (an abnormal power quality), or voltage fluctuations.

If an actual or potential software error is detected, at step 704, the ATM that exhibits the error may try to reach a network server, such as a server in the same region or time zone, to obtain a software fix (or scripts) to rebuild, reimage, or repair the software at the ATM. At step 706, the system may attempt to reach the regular protocol network, i.e. the regular network over which the ATM communicates. If the regular network is reachable, at step 712, the regular protocol may be used by the ATM to request from the server a copy of a fix or interim build or software drivers or a working build copy to be used by the ATM to fix the error. Thereafter, the error at the ATM may be fixed using the software or scripts that are obtained from the server. The software may be obtained in a sequence requested by the ATM. Thus, the ATM may first request certain software or scripts and then request additional software or scripts to rebuild or repair the ATM in stages.

However, if the regular network is down so that the first ATM is offline, at step 708, the offline ATM may advantageously use the LoRaWAN module and network to attempt to connect to a nearby online ATM. If this connection between the first and second ATMs is established at step 708 using the LoRaWAN network, at step 710, the first ATM may request from the nearby online ATM or from a server that is in communication with the second ATM via the LoRaWAN network a copy of a fix or interim build or software drivers or a working build copy to be used by the ATM to fix the error. Thereafter, the error at the ATM may be addressed using the software or scripts that are obtained from the server. The software may be obtained in a sequence requested by the ATM. Thus, the ATM may first request certain software or scripts and then request other software or scripts to rebuild, or repair the ATM in stages. The software obtained through the ATM communications network or through the LoRaWAN network may be identical or similar or may be somewhat different to reflect an error that may have resulted in the inability of the ATM to connect through the ATM communications network. As software may be obtained directly from another ATM, the ATMs may collectively impersonate an intelligent processor distributed network for on-demand repairs, reimaging or rebuilding of a faulty ATM.

After the ATM is rebooted and if the ATM is then back up and running, at step 703, the ATM may return to monitoring for errors at step 702.

FIG. 8A further shows an illustrative system in which this method may be performed. When a first ATM 800 that is online and is in communication with a network server (an application server) 830 experiences an error, software or scripts for a repair or rebuild may be remotely obtained from network server 830 over link 808 for distribution to and installation on ATM 800. The software or scripts may be ATM build software or scripts available from an intelligent build manager 840. The software or scripts may be obtained by request or by notifying network server 830 that there may be an error at ATM 800. The software or scripts may be pushed to ATM 800, such as to reimage and reboot ATM 800 to restore operations. For example, the software that may be provided at intelligent build manager 840 may include device drivers, application software and operating system software or patches. This software distribution and reimaging and rebooting operation may restore the ATM automatically relatively quickly, for example, in minutes rather than over a longer time (hours or days) that it takes until a technician may be dispatched to repair ATM 800.

When ATM 800 is offline and is unable to communicate with network server 830 directly, ATM 800 may be able to wirelessly communicate with a second LPWAN-enabled ATM 810 using a LoRaWAN network. This communication may pass through a LoRaWAN gateway 804 (a concentrator gateway to concentrate data packets to a working ATM) and a LoRaWAN network server 806 and use ATM 810 to obtain any software or scripts needed for a rebuild, reimage, or repair. The necessary software may be available on ATM 810 or on a server in communication with ATM 810. The software necessary for an automated rebuild, reimage, or repair may be an intelligent build manager, such as the software that may be available on network server 830. An intelligent build manager may be stored on each ATM in the network to allow for these repairs. For example, ATM 810 may obtain the intelligent build manager software from network server 830, directly or possibly through another ATM in the same time zone that is in communication with network server 830 over link 822. The ATM 810 that is used may be in the same region or time zone as ATM 800. In the United States, some of the regions/time zones 820 include East 820a, Central 820b, Mountain 820c, and Pacific 820d. This is because it is more likely that the type of error that is identified is also found within other ATMs in a particular region or time zone. Also, ATMs from a particular vendor, which have vendor-specific software, may be more prevalent in a particular region or time zone.

Referring to FIG. 8B, the intelligent build manager software that may be needed at ATM 800 to repair or rebuild ATM 800 may include operating system software 850, patches or upgrades, vendor-specific software 852 for device control including device drivers, and application software 854, which may be at the presentation layer and may include middleware 856. The vendor-specific software may be software that is specific to a particular ATM vendor that manufactures the ATMs.

Figure 9:
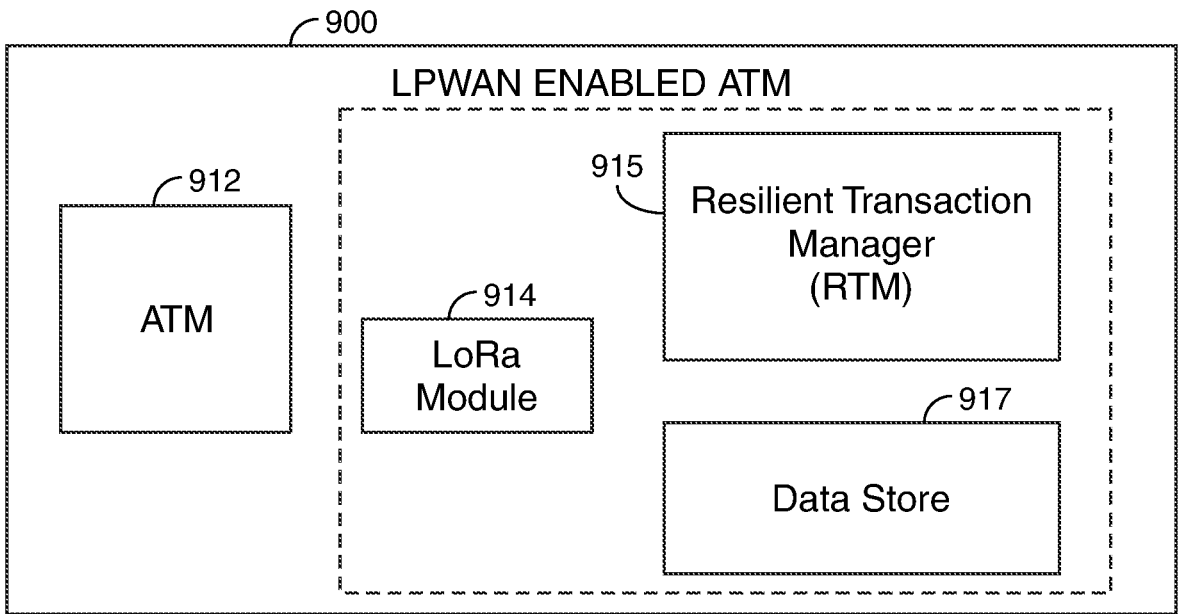
FIG. 9 shows an illustrative LPWAN-enabled ATM having a resilient transaction module that may maintain a record of operations performed using the ATM before an ATM outage in accordance with principles of the disclosure.

FIG. 9 shows an illustrative ATM 900 in accordance with another aspect of the invention. ATM 900 may include an LPWAN-enabled ATM that includes an ATM 912, a LoRaWAN module 914, a resilient transaction manager (RTM) 915, and a data store (memory) 917. RTM 915 may include data store 917. RTM 915 may be implemented in the LoRaWAN module 914 or may be software that is resident at ATM 900. RTM 915 may be used as an intelligent monitoring system to monitor a state of operations of ATM 900, such as the transaction details that were requested by the customer and the operations that were performed in response. The RTM may act as an intelligent monitoring system during the execution of a transaction to sense any fluctuations and to kick in immediately to record a state of operations. In embodiments, the RTM may record the state of operations continuously. A record of the state of operations being performed during a particular transaction may be maintained in the data store 917, which may be part of LoRaWAN module 914.

Figure 10:
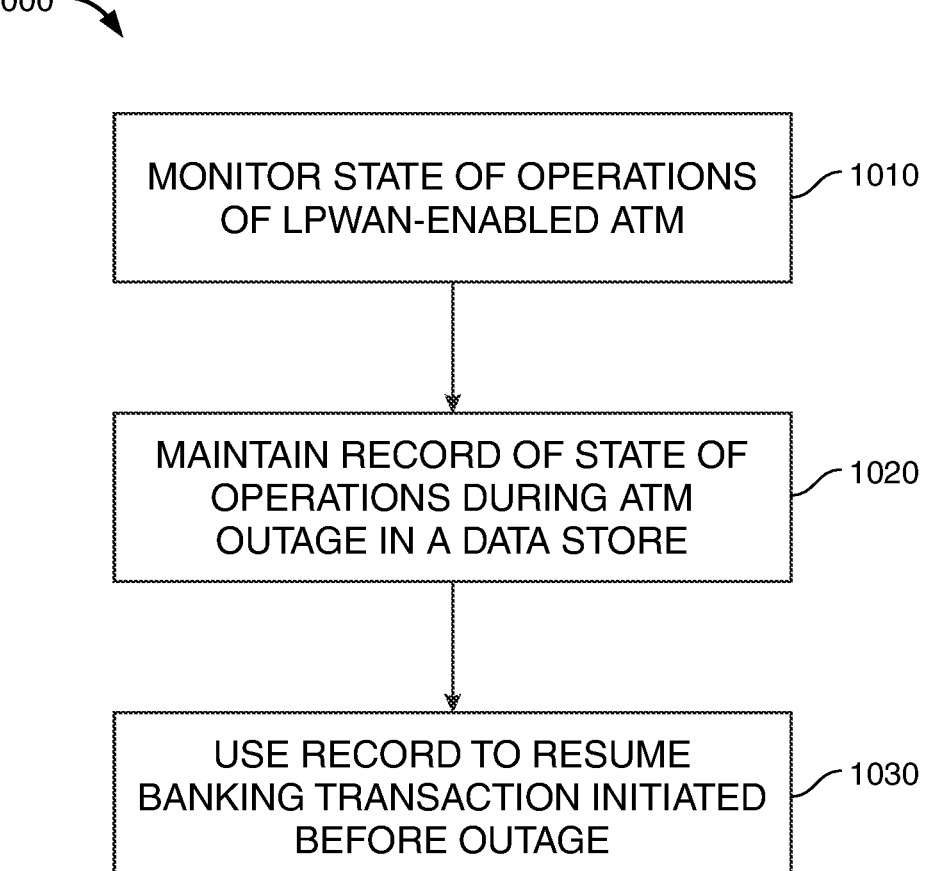
FIG. 10 shows an illustrative flow chart of steps that may be performed to maintain transaction information for a transaction at the ATM using the LoRaWAN architecture and to resume the transaction after the outage ends at the ATM in accordance with principles of the invention.

FIG. 10 shows an illustrative flow chart 1000 of steps that may be performed by ATM 900, such as by RTM 915. At step 1010, the LoRaWAN module 914, using RTM 915, may monitor the state of operations being performed during the execution of a transaction. At step 1020, LoRaWAN module 914 may capture and maintain a record of a state of operations that have been performed in performing the banking transaction using ATM 900. This record may be maintained in data store 917 for a short period, such as for a few minutes or longer. While the banking transaction is in progress, there may be an outage at ATM 900 that interrupts the banking transaction momentarily and the banking transaction cannot be immediately completed. A momentary outage may last as little as 1-2 seconds, or it may be longer. In the absence of a LoRaWAN module 914, this may cause the state of the transaction to be lost and the transaction may have to be restarted from scratch. However, because a record of the state of operations has been retained, at step 1030, the record may be accessed from data store 917 and used at ATM 900 to resume the banking transaction at the stage where it was interrupted before the outage. The system may be configured so that the transaction is resumed without the customer even knowing that there was an issue. However, for some outages, RTM 915 may send an inquiry to the customer asking whether the customer wishes to complete the transaction. If the customer does wish to complete the transaction, RTM 915 may execute the previously-initiated transaction on behalf of the customer.

For example, the operations whose state is recorded may include, for example, requesting a withdrawal transaction for a particular amount from a particular account. Then, there may be an outage for a time at ATM 912. When the outage is over, ATM 912 may be able to access the record of the state of operations to determine the last state of the transaction and may then offer the customer the opportunity to resume the transaction from that point. Thus, the transaction may be completed and the cash dispensed without the customer having to restart the transaction from scratch. The customer may be asked whether the customer wishes to proceed with the transaction before proceeding, and ATM 912 may proceed to dispense the requested cash from the previously-specified account only if the customer agrees.

One of ordinary skill in the art will appreciate that the steps shown and described herein may be performed in other than the recited order and that one or more steps illustrated may be optional. The methods of the above-referenced embodiments may involve the use of any suitable elements, steps, computer-executable instructions, or computer-readable data structures. In this regard, other embodiments are disclosed herein as well that can be partially or wholly implemented on a computer-readable medium, for example, by storing computer-executable instructions or modules or by utilizing computer-readable data structures.

Thus, computer program products, methods, systems, and apparatuses may leverage a LoRaWAN module at an ATM to increase resiliency of the ATM by enabling the ATM to maintain operations or automatically obtain software to fix an error at the ATM through a nearby ATM, when necessary, and to resume a banking transaction that was interrupted during an outage. Persons skilled in the art will appreciate that the present invention can be practiced by other than the described embodiments, which are presented for purposes of illustration rather than of limitation.

What is claimed is:

1. A computer program product comprising executable instructions that, when executed by a processor on a computer system:

monitor a connection between a first automated teller machine (ATM) and one or more application servers of a bank over an ATM communications network to determine whether the connection over the ATM communications network is functioning to perform banking transactions using the first ATM, wherein the one or more application servers process the banking transactions; and during an outage in the connection between the first ATM and the one or more application servers over the ATM communications network, select, using a wireless long range wide area (LoRaWAN) gatekeeper, a second ATM from a plurality of available ATMs to use for routing communications between the first ATM and the one or more applications servers, the LoRaWAN gatekeeper selecting the second ATM based on load balancing across the plurality of available ATMs, whether an ATM of the plurality of available ATMs is already in use by an in-person user or by another offline ATM, the strength of LoRaWAN signals of the plurality of available ATMs, or a distance between the first ATM and the plurality of available ATMs;

exchanging, between the first ATM and the one or more application servers, banking transaction data related to one or more of the banking transactions to enable initiation and completion of performance by a user at the first ATM of the one or more of the banking transactions by routing the banking transaction data to or from the one or more application servers through a LoRaWAN network that is connected to the first ATM and the second ATM to exchange the banking transaction data between the first ATM and the second ATM using the LoRaWAN network and between the second ATM and the one or more application servers through the ATM communications network that is connecting the second ATM and the one or more application servers, thereby allowing continuing communications between the first ATM and the one or more application servers via the second ATM despite the outage;

wherein each of the first ATM and the second ATM has a respective module that enables communications between the first ATM and the second ATM using the LoRaWAN network.

2. The computer program product of claim 1, wherein the monitoring of the connection comprises: performing a periodic health check of the first ATM to determine whether the first ATM is connected to the ATM communications network.

3. The computer program product of claim 1, wherein the executable instructions further: transmit a notification, via the second ATM, to notify a module in communication with the ATM communications network of the outage in the connection between the first ATM and the one or more application servers over the ATM communications network.

5

\* \* \* \* \*